United States Patent
Lee

(10) Patent No.: US 9,431,840 B2
(45) Date of Patent: Aug. 30, 2016

(54) CHARGER AND DRIVING METHOD THEREOF

(71) Applicant: Hyundai Motor Company, Seoul (KR)

(72) Inventor: Dae Woo Lee, Gyeongsangbuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 281 days.

(21) Appl. No.: 14/101,100

(22) Filed: Dec. 9, 2013

(65) Prior Publication Data

US 2014/0184140 A1 Jul. 3, 2014

(30) Foreign Application Priority Data

Dec. 28, 2012 (KR) .................. 10-2012-0157476

(51) Int. Cl.
*H02J 7/00* (2006.01)
*H02M 3/158* (2006.01)
*H02J 7/02* (2016.01)

(52) U.S. Cl.
CPC .............. *H02J 7/0054* (2013.01); *H02J 7/022* (2013.01); *H02M 3/1582* (2013.01)

(58) Field of Classification Search
CPC ...................................................... H02J 7/022
See application file for complete search history.

(56) References Cited

U.S. PATENT DOCUMENTS

| 5,302,858 A * | 4/1994 | Folts | H02J 7/022 307/100 |
|---|---|---|---|
| 7,889,524 B2 * | 2/2011 | Lee | H02J 7/022 307/10.1 |
| 2003/0038612 A1 * | 2/2003 | Kutkut | H02M 3/33561 320/140 |
| 2010/0052423 A1 * | 3/2010 | Shimada | H02M 3/33507 307/43 |
| 2010/0142228 A1 * | 6/2010 | Yamauchi | B60L 11/1868 363/17 |
| 2010/0232181 A1 * | 9/2010 | Nakahori | H01F 27/2804 363/17 |
| 2012/0049820 A1 * | 3/2012 | Moussaoui | H02M 1/36 323/282 |
| 2012/0112547 A1 * | 5/2012 | Ghosh | H02J 9/062 307/66 |
| 2012/0235626 A1 * | 9/2012 | Oh | H02J 7/0022 320/103 |
| 2013/0322137 A1 * | 12/2013 | Lee | H02M 7/217 363/45 |

(Continued)

FOREIGN PATENT DOCUMENTS

| JP | 2000-358305 A | 12/2000 |
|---|---|---|
| JP | 2011-244523 A | 12/2011 |

(Continued)

OTHER PUBLICATIONS

Kang Chan Ho, KR 101295317 B1, Aug. 2013 United Charging System for Power Converting Unit of Electric Vehicle Description translation.*

(Continued)

*Primary Examiner* — Drew A Dunn
*Assistant Examiner* — Tynese McDaniel
(74) *Attorney, Agent, or Firm* — McDermott Will & Emery LLP

(57) ABSTRACT

A charger for charging a high voltage battery and a low voltage battery, includes a bidirectional buck boost converter, a first full duty converter and a second full duty converter. The bidirectional buck boost converter is configured to supply power to the high voltage battery or supply power to the low voltage battery from the high voltage battery. The first full duty converter is configured to generate charging power by using an AC commercial power supply. The second full duty converter is connected to the first full duty converter and the bidirectional buck boost converter and configured to generate charging power in the low voltage battery.

14 Claims, 2 Drawing Sheets

(56) References Cited

U.S. PATENT DOCUMENTS

2014/0313784 A1* 10/2014 Strzalkowski .... H02M 3/33584
                                                    363/17
2014/0334189 A1* 11/2014 Yan ................... H02M 3/33584
                                                    363/17

FOREIGN PATENT DOCUMENTS

| JP | 2012-125137 A | 6/2012 | | |
|---|---|---|---|---|
| KR | 10-1203882 B1 | 11/2012 | | |
| KR | 101203882 B1 * | 11/2012 | ................ | H02J 7/02 |
| KR | 101295317 B1 * | 8/2013 | | |

OTHER PUBLICATIONS

Kang Chan Ho, KR 101295317 B1, Aug. 2013 United Charging System for Power Converting Unit of Electric Vehicle claims translation.*

KR 101203882 B1, Nov. 2012 Insulated Bi-Directional Charging System translation Description of KR101203882.*

KR 101203882 B1, Nov. 2012 Insulated Bi-Directional Charging System translation Claims of KR101203882.*

* cited by examiner

CHARGER AND DRIVING METHOD THEREOF

CROSS-REFERENCE TO RELATED APPLICATION

This application claims benefit of priority to Korean Patent Application No. 10-2012-0157476 filed in the Korean Intellectual Property Office on Dec. 28, 2012, the entire contents of which are incorporated herein by reference.

TECHNICAL FIELD

The present inventive concept relates to a charger and a driving method thereof. For example, the present inventive concept relates to a converter charger which can be applied to a plug-in hybrid car and an electric car, and a driving method of the converter charger.

BACKGROUND

Improving the efficiency of a converter for charging a low voltage battery and a converter for charging a high voltage battery, which is directly connected to improving the fuel efficiency, is an essential task as interests in an environmentally-friendly car have risen due to environmental pollution that becomes a global issue.

In a plug-in hybrid car and an electric car, the efficiency of a charger and an LDC (low voltage DC-DC converter) is directly related to the fuel efficiency. According to a conventional method, an input and output voltage range is wide and thus a current at a primary side becomes large, and the charger and the LDC are manufactured as different products, thereby decreasing the efficiency and increasing a size.

Further, the reduced efficiency increases heat of the charger and the converter, thereby causing a radiant heat problem.

The above information disclosed in this Background section is only for enhancement of understanding of the background of the inventive concept and therefore it may contain information that does not form the prior art.

SUMMARY

The present inventive concept has been made in an effort to minimize currents flowing in a charger and an LDC switching device to increase the efficiency in comparison with the conventional method, and to implement the charger as an integrated package which can charge a low voltage battery and a high voltage battery.

An aspect of the present inventive concept relates to a charger for charging a high voltage battery and a low voltage battery. The charger includes a bidirectional buck boost converter configured to supply power to the high voltage battery or supply power to the low voltage battery from the high voltage battery, a first full duty converter configured to generate charging power by using an AC commercial power supply, and a second full duty converter connected to the first full duty converter and the bidirectional buck boost converter and configured to generate charging power in the low voltage battery.

The charger may further include a power factor correction circuit connected between the AC commercial power supply and the first full duty converter. A maximum value of an output voltage of the power factor correction circuit may be set as a maximum voltage value of the AC commercial power supply.

The power factor correction circuit may include a first inductor including one electrode connected to the AC commercial power supply, a switch including one electrode connected to the other electrode of the first inductor, a diode including an anode connected to one electrode of the switch and the other electrode of the first inductor, and an electrolytic condenser connected to a cathode of the diode.

The electrolytic condenser may set a capacity based on a time when the AC commercial power supply is not supplied intermittently and on a ripple quantity of an output voltage of the power factor correction circuit.

The first full duty converter may include a full bridge including four switches, a first transformer connected to the full bridge, and four diodes configured to form a bridge diode connected to the first transformer.

The first transformer may include a primary coil and a secondary coil connected between a node connected to two switches of the four switches of the full bridge and another node connected to the two remaining switches of the four switches, and a coil ratio between the primary coil and the secondary coil is set such that a minimum value of a voltage supplied to the first full duty converter is converted to a maximum value within a range of voltages required for charging the high voltage battery.

The charger may further include a capacitor connected between the first full duty converter and the bidirectional buck boost converter.

The bidirectional buck boost converter may include a connection switch having one electrode connected to the first full duty converter and the second full duty converter, a synchronous switch having one electrode connected to the other electrode of the connection switch, an inductor connected to one electrode of the synchronous switch and the other electrode of the connection switch, and a first capacitor including one electrode connected to one electrode of the inductor and the other electrode connected to the other electrode of the synchronous switch.

The charger may further include a relay for charging the low voltage battery connected between a node connected to the first full duty converter and the bidirectional buck boost converter and the second full duty converter.

The relay may be configured to transmit power supplied from at least one of the first full duty converter and the bidirectional buck boost converter to the second full duty converter.

The second full duty converter may include four switches configured to form a full bridge, a second transformer connected to the full bridge, and two diodes connected to a secondary side of a second transformer.

The second transformer may include a primary coil and a secondary coil connected between a node connected to two switches of the four switches of the full bridge and another node connected to the two remaining switches of the four switches. A coil ratio between the primary coil and the secondary coil may be set such that a current flowing in the primary side is minimized.

The secondary coil may be divided into two coils, one of the two diodes may be connected between one of the two coils and a ground, and the other diode of the two diodes may be connected between the other coil of the two coils and the ground.

The second full duty converter may further include an inductor including one electrode connected to a node connected to the two coils.

The charger may further include a capacitor including one electrode connected to one electrode of the inductor and the other electrode connected to the ground. The low voltage battery may be connected to both ends of the capacitor.

Another aspect of the present inventive concept encompasses a method of driving a charger comprising a first full duty converter and a second full duty converter. According to the method, charging power is generated by using an AC commercial power supply through the first full duty converter. The charging power is supplied to at least one of a high voltage battery and a low voltage battery. Power supplied from the high voltage battery is supplied to the low voltage battery through the second full duty converter.

In the supplying of the charging power to the high voltage battery, the charging power may be connected to the high voltage battery through an inductor, energy stored in the inductor may be supplied to the high voltage battery.

In the supplying of the power supplied from the high voltage battery to the low voltage battery, the high voltage battery may be connected to the second full duty converter through the inductor; and energy stored in the inductor may be supplied to the second full duty converter.

Another aspect of the present inventive concept relates to a charger as an integrated package which can minimize currents flowing in the charger and an LDC switching device to increase the efficiency in comparison with the conventional method and charge a low voltage battery and a high voltage battery, and a driving method of the charger.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
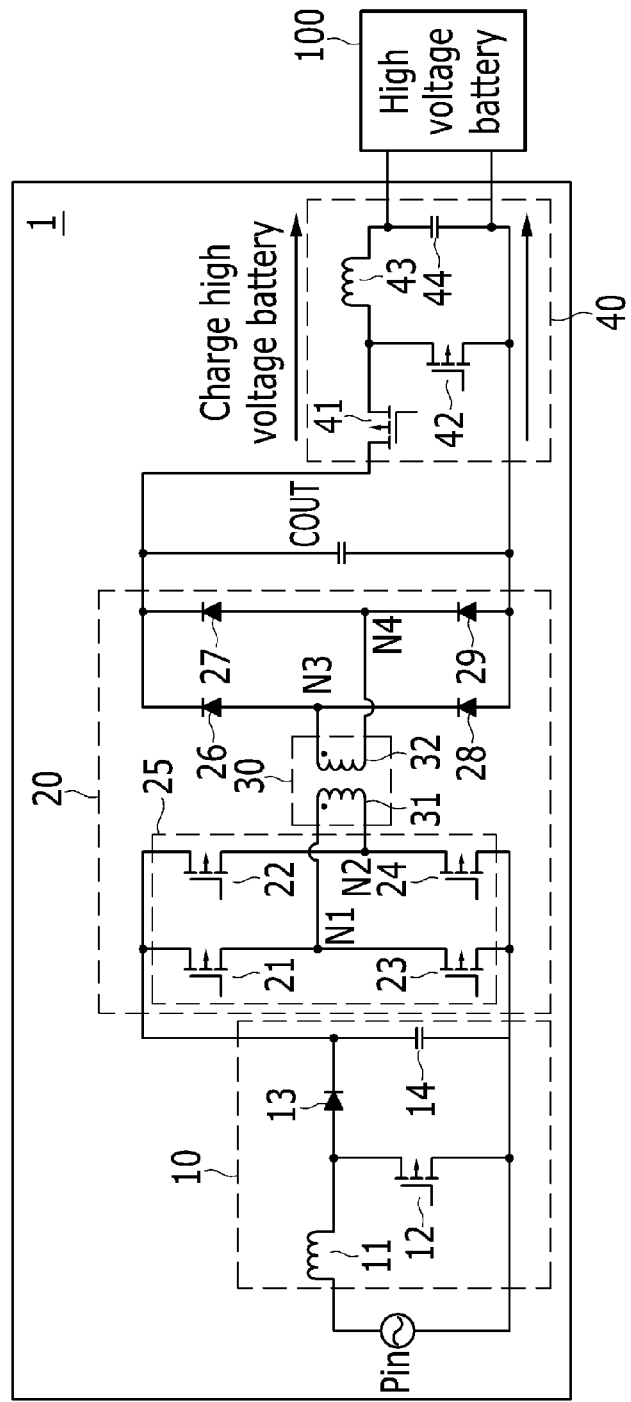
FIG. 1 is a diagram illustrating a part of a charger according to an exemplary embodiment of the present inventive concept.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. Like reference numerals designate like elements throughout the specification.

Hereinafter, a charger and a driving method thereof according to an exemplary embodiment of the present inventive concept will be described with reference to the accompanying drawings.

FIG. 1 is a diagram illustrating a part of a charger according to an exemplary embodiment of the present inventive concept.

Figure 2:
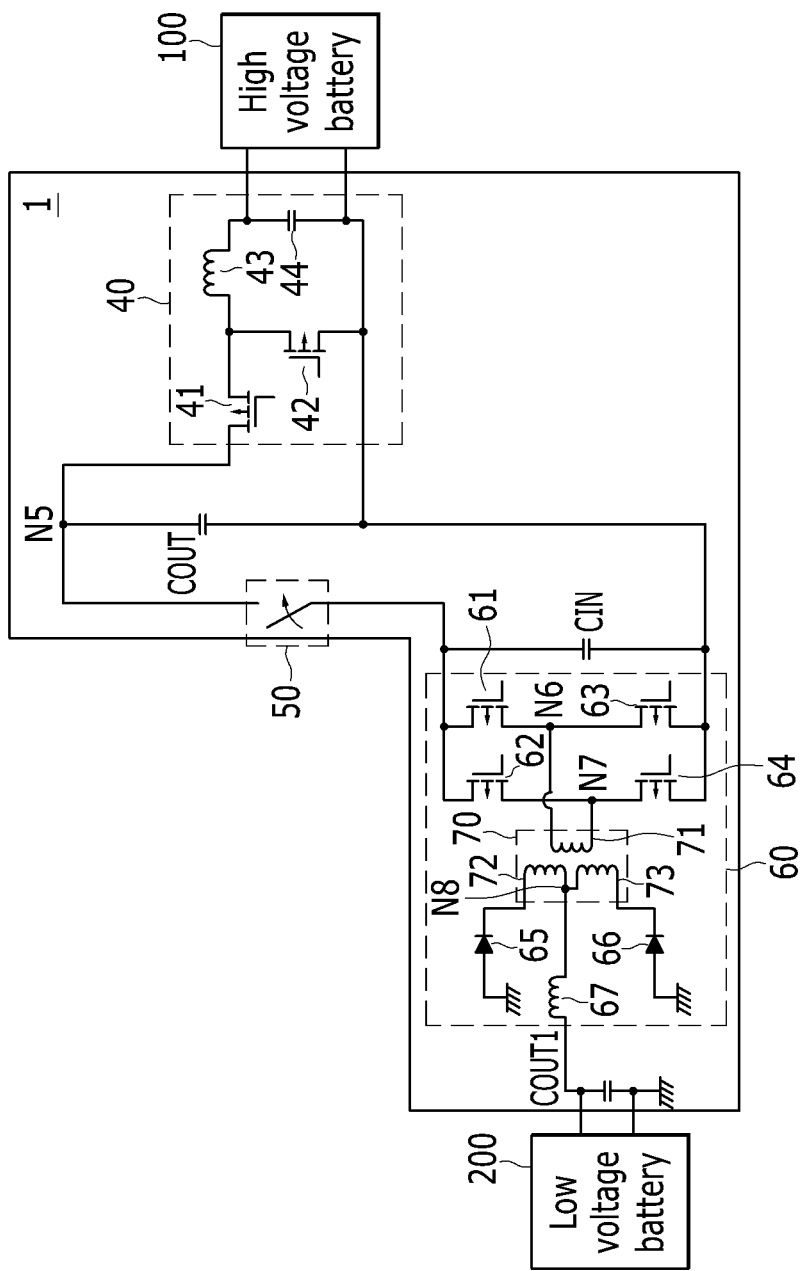
FIG. 2 is a diagram illustrating the remaining parts of the charger according to an exemplary embodiment of the present inventive concept.

FIG. 2 is a diagram illustrating the remaining parts of the charger according to an exemplary embodiment of the present inventive concept.

As illustrated in FIG. 1, a charger 1 may include a power factor correction circuit 10, a first full duty converter 20, a capacitor COUT, and a bidirectional buck boost converter 40.

As illustrated in FIG. 2, the remaining parts of the charger 1 may include a capacitor CIN, a second full duty converter 60, and a capacitor COUT1.

Hereinafter, the charger and a driving method thereof according to an exemplary embodiment of the present inventive concept will be described with reference to FIGS. 1 and 2.

The power factor correction circuit 10 may be connected to an AC commercial power supply Pin and minimize reactive power by making a phase of an input current flowing from the AC commercial power supply Pin similar to an input voltage. Power, of which a power factor has been improved through the power factor correction circuit 10, may be transmitted to the first full duty converter 20.

The power factor correction circuit 10 may include a first inductor 11, a power factor switch 12, a first rectifier diode 13, and an electrolytic condenser 14.

The power factor switch 12 may be implemented by an n channel type transistor. The power factor switch 12 may be turned on when a high level voltage is input to a gate electrode of the power factor switch 12, and turned off when a low level voltage is input.

One electrode of the first inductor 11 may be connected to the AC commercial power supply Pin and the other electrode may be connected to one electrode (drain in FIG. 1) of the power factor switch 12 and an anode of the first rectifier diode 13. The power factor switch 12 may control an operation of the power factor correction circuit 10.

A cathode of the first rectifier diode 13 may be connected to one electrode of the electrolytic condenser 14.

A current may flow from the AC commercial power supply Pin to the first inductor 11 and the power factor switch 12, and energy may be stored in the first inductor 11 while the power factor switch 12 is turned on. At this time, the first rectifier diode 13 may be in a non-conductivity state.

The first rectifier diode 13 may become conductible while the power factor switch 12 is turned off.

Then, the energy stored in the first inductor 11 may flow to the electrolytic condenser 14 through the first rectifier diode 13, and an output voltage of the power factor correction circuit 10 may be charged in the electrolytic condenser 14.

A maximum output of the power factor correction circuit 10 can be set according to a maximum voltage value of the AC commercial power supply Pin. For example, a maximum value of the output voltage of the power factor correction circuit 10 can be set as the maximum voltage value of the AC commercial power supply Pin.

A capacity of the electrolytic condenser 14 can be set by considering time at which the AC commercial power supply Pin is not supplied intermittently and a ripple quantity of the output voltage of the power factor correction circuit 10.

The first full duty converter 20 may receive the output voltage of the power factor correction circuit 10, convert the output voltage of the power factor correction circuit 10 to AC power through a switching operation, and rectify the AC power again, so as to generate charging power.

The first full duty converter 20 may include four switches 21 to 24 for forming a full bridge 25, a transformer 30, and four diodes 26 to 29.

The four switches 21 to 24 may be implemented by n channel type transistors. The four switches 21 to 24 may be turned on when a high level voltage is supplied to a gate electrode and turned off when a low level voltage is supplied to the gate electrode.

A drain of the switch 21 may be connected to one electrode of the electrolytic condenser 14, and a source of the switch 21 may be connected to a node N1 (see FIG. 1). A drain of the switch 22 may be connected to one electrode of the electrolytic condenser 14, and a source of the switch 22 may be connected to a node N2 (see FIG. 1).

A drain of the switch 23 may be connected to the node N1, and a source of the switch 23 may be connected to the AC commercial power supply Pin. A drain of the switch 24 may be connected to the node N2, and a source of the switch 24 may be connected to the AC commercial power supply Pin.

A current may flow from the node N1 to the node N2 through a primary coil 31 during a period for which the switch 21 and the switch 24 are turned on, and a current may flow from the node N2 to the node N1 through the primary coil 31 during a period for which the switch 23 and the switch 24 are turned on.

The transformer 30 may include the primary coil 31 and a secondary coil 32, and transmit energy stored in the primary coil 31 to the secondary coil 32. A coil ratio (coil ratio between the primary coil 31 and the secondary coil 32) of the transformer 30 can be set such that a minimum value of the voltage supplied to the first full duty converter 20 is converted to a maximum value within a range of voltages required for charging the high voltage battery 100.

Through the four diodes 26 to 29 for forming a bridge diode, the current flowing in the secondary coil 32 may be rectified and charged in the capacitor COUT.

An anode of the first diode 26 may be connected to the node N3, and a cathode of the first diode 26 may be connected to one electrode of the capacitor COUT. An anode of the second diode 27 may be connected to the node N4, and a cathode of the second diode 27 may be connected to one electrode of the capacitor COUT.

A cathode of the third diode 28 may be connected to the node N3, and an anode of the third diode 28 may be connected to the other electrode of the capacitor COUT. A cathode of the fourth diode 29 may be connected to the node N4, and an anode of the fourth diode 29 may be connected to the other electrode of the capacitor COUT.

For example, while a current flows from the node N1 to the node N2 through the primary coil 31, the current may flow from the node N4 to the node N3 through the first and fourth diodes 26 and 29, and the capacitor COUT may be charged by the current.

While a current flows from the node N2 to the node N1 through the primary coil 31, the current may flow from the node N3 to node N4 through the second and third diodes 27 and 28, and the capacitor COUT may be charged by the current.

The first full duty converter 20 may be controlled to minimize the current flowing to a primary side of the transformer 30 when the high voltage battery 100 is charged. It is because the charging efficiency is improved as the current flowing to the primary side is smaller.

The bidirectional buck boost converter 40 may control a voltage and a current for charging the high voltage battery 100 and a low voltage battery 200 (illustrated in FIG. 2). A synchronization scheme may be used to improve the charging efficiency.

The bidirectional buck boost converter 40 may include two switches, e.g., a connection switch 41 and a synchronous switch 42, an inductor 43, and a capacitor 44. The two switches 41 and 42 may be n channel type transistors, which are turned on when a high level voltage is supplied to a gate electrode and turned off when a low level voltage is supplied.

One electrode (drain in FIG. 1) of the connection switch 41 may be connected to one electrode of the capacitor COUT. The other electrode (source in FIG. 1) of the connection switch 41 may be connected to one electrode (drain in FIG. 1) of the synchronous switch 42 and one electrode of the inductor 43.

The other electrode of the inductor 43 may be connected to one electrode of the capacitor 44, and the other electrode (source in FIG. 1) of the synchronous switch 42 may be connected to the other electrode of the capacitor COUT and the other electrode of the capacitor 44. The high voltage battery 100 may be connected to both ends of the capacitor 44.

For example, during a period for which the connection switch 41 is turned on and the synchronous switch 42 is turned off, energy may be stored in the inductor 43 and a current may be supplied to the capacitor 44 and the high voltage battery 100. Further, during a period for which the connection switch 41 is turned off and the synchronous switch 42 is turned on, energy charged in the inductor 43 may be supplied to the capacitor 44 and the high voltage battery 100.

That is, the bidirectional buck boost converter 40 may operate as a buck converter when the high voltage battery 100 is charged.

As illustrated in FIG. 2, the capacitor CIN may be connected to the capacitor COUT and the bidirectional buck boost converter 40 in parallel. A relay 50 may be located between a node N5 connected to the capacitor COUT and the bidirectional buck boost converter 40, and one electrode of a second full duty converter 60 and the capacitor CIN.

The relay 50 is connected to the second full duty converter 60 for charging the low voltage battery. When the relay 50 is turned on, the power supplied from at least one of the first full duty converter 20 and the bidirectional buck boost converter 40 may be transmitted to the second full duty converter 60. When it is required to charge the low voltage battery 200 by using the high voltage battery 100 in order to use an electrical load during driving, the relay 50 can be turned on so that output power of the high voltage battery 100 may be transmitted only to the low voltage battery 200.

The second full duty converter 60 may include four switches 61 to 64 for forming a full bridge, a transformer 70, two diodes 65 and 66, and an inductor 67. The second full duty converter 60 may receive power from at least one of the first full duty converter 20 and the bidirectional buck boost converter 40 and generate charging power for charging the low voltage battery 200.

When the low voltage battery 200 is charged, the current flowing to a primary side of the transformer 70 can be minimized by optimizing a coil ratio (coil ratio between a primary coil and a secondary coil) of the transformer 70, thereby increasing the efficiency.

The four switches 61 to 64 may be implemented by n channel type transistors. The four switches 61 to 64 may be turned on when a high level voltage is supplied to a gate electrode and turned off when a low level voltage is supplied to the gate electrode.

A drain of the switch 61 may be connected to one electrode of the capacitor CIN, and a source of the switch 61 may be connected to a node N6. A drain of the switch 62 may be connected to one electrode of the capacitor CIN, and a source of the switch 62 may be connected to a node N7.

A drain of the switch 63 may be connected to the node N6, and a source of the switch 63 may be connected to the other electrode of the capacitor CIN. A drain of the switch 64 may be connected to the node N7, and a source of the switch 64 may be connected to the other electrode of the capacitor CIN.

A current may flow from the node N6 to the node N7 through a primary coil 71 during a period for which the switch 61 and the switch 64 are turned on, and a current may flow from the node N7 to the node N6 through the primary coil 71 during a period for which the switch 62 and the switch 63 are turned on.

The transformer 70 may include the primary coil 71 and two secondary coils 72 and 73, and transmit energy stored in the primary coil 71 to one of the two secondary coils 72 and 73. A coil ratio of the transformer 70 can be set by considering a maximum output voltage of the low voltage battery 200 and parasitic inductance of the second full duty converter 60.

A maximum allowable load value can be selected by considering a voltage range and output power of the high voltage battery 100, and an output voltage of the bidirectional buck boost converter 40 can be set as about 80% of a switching device selection value of the bidirectional buck boost converter 40.

An anode of the diode 65 may be connected to the ground, and a cathode of the diode 65 may be connected to one electrode of the secondary coil 72. The other electrode of the secondary coil 72 and one electrode of the secondary coil 73 may be connected to a node N8. An anode of the diode 66 may be connected to the ground, and a cathode of the diode 66 may be connected to the other electrode of the secondary coil 73.

One electrode of the inductor 67 may be connected to a node N8, and the other electrode of the inductor 67 may be connected to one electrode of the capacitor COUT1. The other electrode of the capacitor COUT1 may be connected to the ground.

The low voltage battery 200 may be connected to both ends of the capacitor COUT1.

For example, when the diode 65 becomes conductible and thus a current flows through the secondary coil 72, energy may be stored in the inductor 67 and the current may flow in the capacitor COUT1 and the low voltage battery 200.

Alternatively, when the diode 66 becomes conductible and thus a current flows through the secondary coil 73, energy may be stored in the inductor 67 and the current may flow in the capacitor COUT1 and the low voltage battery 200.

When the connection switch 41 is turned off and the synchronous switch 42 is turned on under a condition where the low voltage battery 200 is charged from output power of the bidirectional buck boost converter 40, a current may flow in the inductor 43 and thus energy may be stored. Inversely, when the connection switch 41 is turned on and the synchronous switch 42 is turned off, energy charged in the inductor 43 may be supplied to the second full duty converter 60.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

Power factor correction circuit 10, First full duty converter 20
Capacitors 44 COUT, COUT, CIN, Bidirectional buck boost converter 40
Second full duty converter 60, Power factor correction circuit 10
First inductor 11, Power factor switch 12, First rectifier diode 13
Electrolytic condenser 14, Full bridge 25, Switches 21 to 24 and 61 to 64
Transformers 30 and 70, Diodes 26 to 29, 65, and 66
Inductors 43 and 67

What is claimed is:

1. A charger for charging a voltage battery, the charger comprising:
    a bidirectional buck boost converter configured to supply power to a first voltage battery or supply power to a second voltage battery from the first voltage battery;
    a first converter configured to generate charging power by using an AC commercial power supply;
    a second converter connected to the first converter and the bidirectional buck boost converter and configured to generate charging power in the second voltage battery; and
    a relay configured to charge the second voltage battery, the relay connected between a node, which is connected to the first converter and the bidirectional buck boost converter, and the second converter,
    wherein the bidirectional buck boost converter comprises: a connection switch having one electrode connected to the first converter and the second converter; a synchronous switch having one electrode connected to the other electrode of the connection switch; an inductor connected to one electrode of the synchronous switch and the other electrode of the connection switch; and a first capacitor including one electrode connected to one electrode of the inductor and the other electrode connected to the other electrode of the synchronous switch.

2. The charger of claim 1, further comprising:
    a power factor correction circuit connected between the AC commercial power supply and the first converter,
    wherein a maximum value of an output voltage of the power factor correction circuit is set as a maximum voltage value of the AC commercial power supply.

3. The charger of claim 2, wherein the power factor correction circuit comprises:
    a first inductor including one electrode connected to the AC commercial power supply,
    a switch including one electrode connected to the other electrode of the first inductor,
    a diode including an anode connected to one electrode of the switch and the other electrode of the first inductor, and
    an electrolytic condenser connected to a cathode of the diode.

4. The charger of claim 3, wherein the electrolytic condenser sets a capacity based on a time when the AC commercial power supply is not supplied intermittently and on a ripple quantity of an output voltage of the power factor correction circuit.

5. The charger of claim 1, wherein:
    the first converter includes
        a full bridge including four switches,
        a first transformer connected to the full bridge, and four diodes configured to form a bridge diode connected to the first transformer, the first transformer includes
a primary coil and a secondary coil, the primary coil being connected between a node that is connected to two switches of the four switches of the full bridge and another node that is connected to the two remaining switches of the four switches, and
a coil ratio between the primary coil and the secondary coil is set such that a minimum value of a voltage supplied to the first converter is converted to a maximum value within a range of voltages required for charging the first voltage battery.

6. The charger of claim 1, further comprising a capacitor connected between the first converter and the bidirectional buck boost converter.

7. The charger of claim 1, wherein the relay is configured to transmit power supplied from at least one of the first converter and the bidirectional buck boost converter to the second converter.

8. The charger of claim 1, wherein:
the second converter includes
four switches configured to form a full bridge,
a second transformer connected to the full bridge, and
two diodes connected to a secondary side of a second transformer,
the second transformer includes a primary coil and a secondary coil, the primary coil being connected between a node that is connected to two switches of the four switches of the full bridge and another node that is connected to the two remaining switches of the four switches, and
a coil ratio between the primary coil and the secondary coil is set such that a current flowing in the primary side is minimized.

9. The charger of claim 8, wherein:
the secondary coil is divided into two coils,
one of the two diodes is connected between one of the two coils and a ground, and
the other diode of the two diodes is connected between the other coil of the two coils and the ground.

10. The charger of claim 9, wherein the second converter further comprises an inductor including one electrode connected to a node connected to the two coils.

11. The charger of claim 10, further comprising:
a capacitor including one electrode connected to one electrode of the inductor and the other electrode connected to the ground,
wherein the second voltage battery is connected to both ends of the capacitor.

12. A method of driving a charger comprising a first converter and a second converter, the method comprising:
generating charging power by using an AC commercial power supply through the first converter;
supplying the charging power to at least one of a first voltage battery and a second voltage battery;
supplying power supplied from the first voltage battery to the second voltage battery through the second converter; and
charging, by a relay, the second voltage battery, in which the relay is connected between a node, which is connected to a first converter and a bidirectional buck boost converter, and a second converter,
wherein the bidirectional buck boost converter comprises: a connection switch having one electrode connected to the first converter and the second converter; a synchronous switch having one electrode connected to the other electrode of the connection switch; an inductor connected to one electrode of the synchronous switch and the other electrode of the connection switch; and a first capacitor including one electrode connected to one electrode of the inductor and the other electrode connected to the other electrode of the synchronous.

13. The method of claim 12, wherein the supplying of the charging power to the first voltage battery comprises:
connecting the charging power to the first voltage battery through an inductor; and
supplying energy stored in the inductor to the first voltage battery.

14. The method of claim 13, wherein the supplying of the power supplied from the first voltage battery to the second voltage battery comprises:
connecting the first voltage battery to the second converter through the inductor; and
supplying energy stored in the inductor to the second converter.

* * * * *